Jan 6, 1931.  J. ORESTER ET AL  1,787,545
LICENSE PLATE HOLDER
Filed July 1, 1929  2 Sheets-Sheet 1
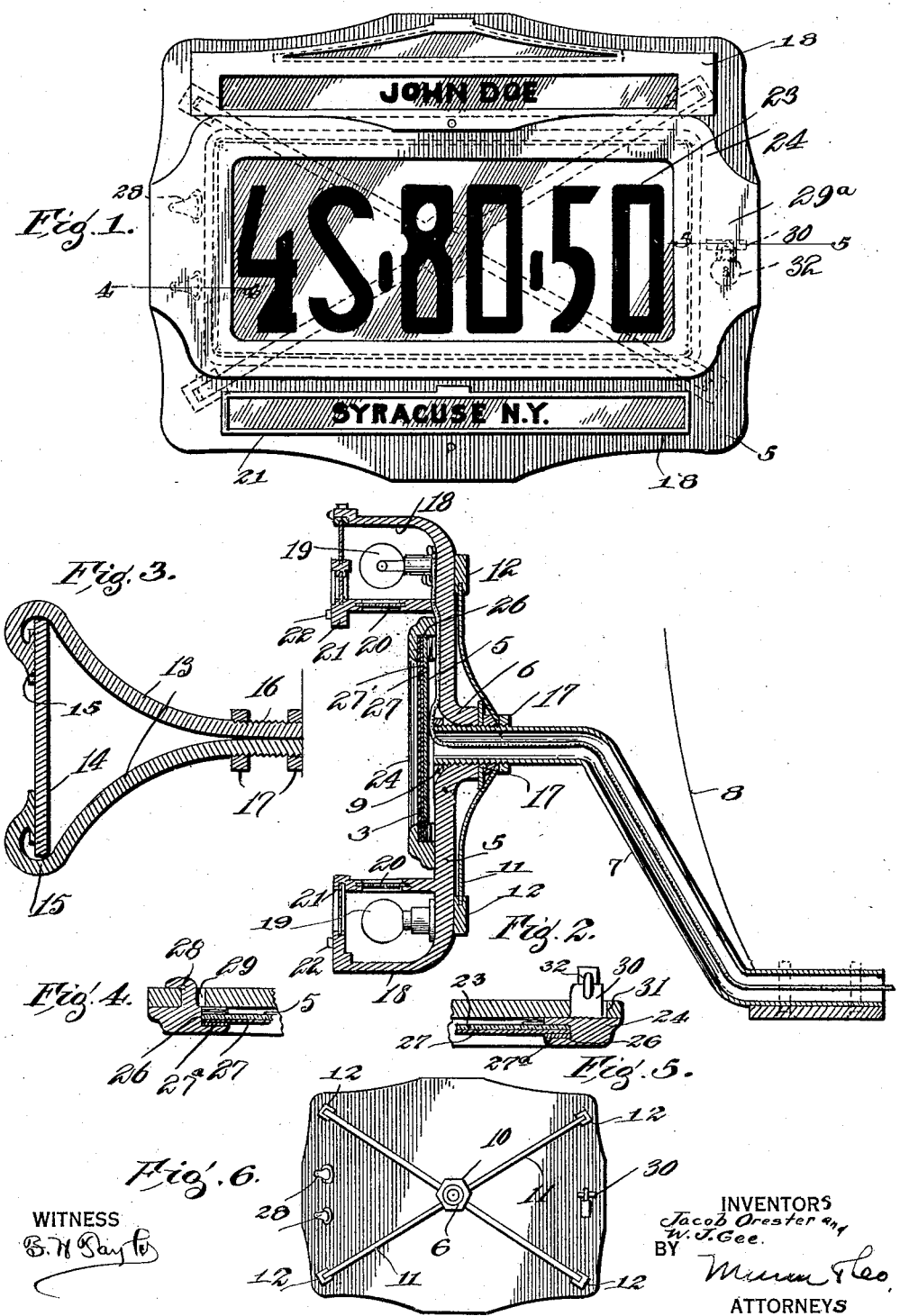
INVENTORS
Jacob Orester and
W. J. Gee.
BY
ATTORNEYS
WITNESS Jan 6, 1931.　　　J. ORESTER ET AL　　　1,787,545

LICENSE PLATE HOLDER

Filed July 1, 1929　　　2 Sheets-Sheet 2

WITNESS

INVENTORS
Jacob Orester and
W. J. Gee
BY
ATTORNEYS

Patented Jan. 6, 1931

1,787,545

UNITED STATES PATENT OFFICE

JACOB ORESTER AND WILLIAM JOHN GEE, OF SYRACUSE, NEW YORK, ASSIGNORS OF ONE-THIRD TO JAMES E. BOYLE, OF SOLVAY, NEW YORK

LICENSE-PLATE HOLDER

Application filed July 1, 1929. Serial No. 375,234.

Our invention relates to license plate holders and has as one of its objects the provision of a license plate holder whereby the plate may be locked against removal and thereby thwart attempt to steal the vehicle bearing the license plate.

Further the invention provides a plate holder of this character embodying a fixed frame for attachment to a motor vehicle and a removable clamping frame to be superimposed on the license plate and secured to the fixed frame without the use of bolts or other analogous fastenings.

Still another object of the invention is to provide an illuminated license plate holder having identification insignia thereon to identify the driver of the motor vehicle, the illuminating means being arranged to illuminate the license tag as well as the identification insignia.

With the preceding and other objects and advantages in mind, the invention consists in the novel combination of elements, constructions and arrangements of parts and operations to be hereinafter more fully described, claimed and illustrated in the accompanying drawings, wherein:

Fig. 1 is a front elevation of the invention;

Fig. 2 is a vertical sectional view of the same supported from the rear of a motor vehicle;

Fig. 3 is a sectional view of a modified form of bracket used in conjunction with the invention;

Fig. 4 is a transverse section taken on the line 4—4 of Fig. 1;

Fig. 5 is a similar view taken on line 5—5 of Fig. 1;

Fig. 6 is a rear elevation of the invention;

Figure 7:
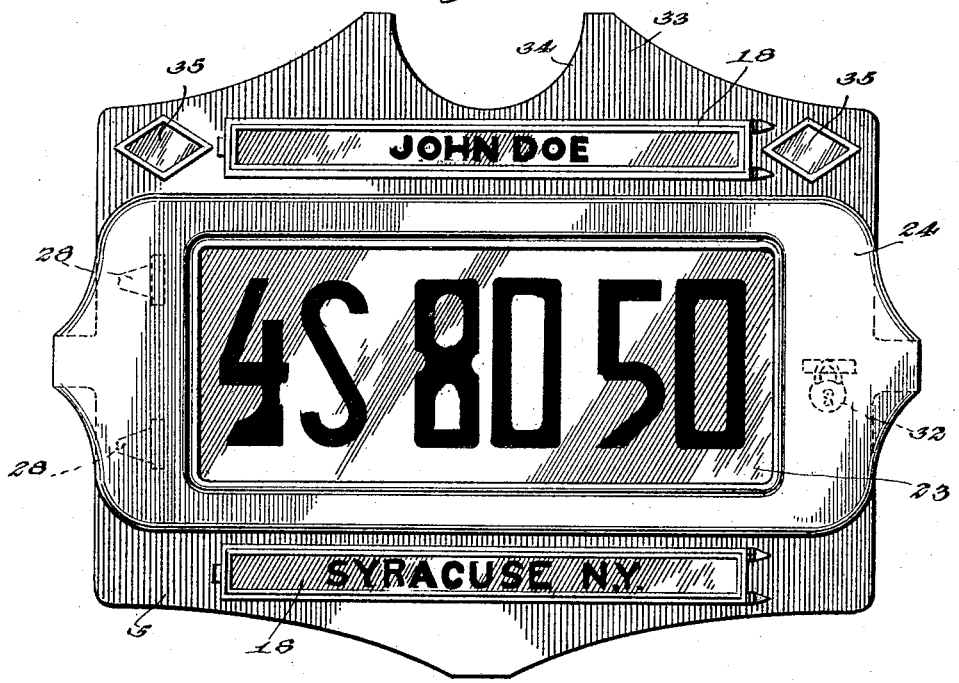
Fig. 7 is a front elevation of a slightly modified embodiment of the invention.

Referring to the invention in detail a rectangular plate 5 having a central rearwardly extending sleeve 6 is provided. A tubular bracket 7 extends rearwardly from the motor vehicle 8 and at one end receives the hub 6. The plate 5 is retained on the bracket by means of a nut 9 threaded on the bracket and engaging the plate.

In order to lend rigidity to the plate 5 a casting or spider 10 having radially extending arms 11 is fixed to the rear end of the bracket and has its ends secured to projections 12 formed on the rear face of the plate.

In lieu of the tubular bracket 7 the bracket disclosed in Fig. 3 is employed when the device is supported from the front end of the motor vehicle. This bracket consists of a pair of rearwardly extending arms 13 which are welded or otherwise secured to the fender brace 14 as indicated at 15. The extremities of the arms 13 extend in parallelism and are exteriorly threaded as at 16 for the reception of retaining nuts 17. The threaded parts 16 are extended through the forward end of the sleeve 6 and the nuts 17 screwed home against the outer end of the sleeve and inner face of the plate 5 respectively.

Longitudinally extending compartments 18 are formed on the upper and lower ends of the plate and contain illuminating bulbs 19. The upper wall of the lower compartment and the lower wall of the upper compartment are provided with transparent panes 20 through which the light rays from the bulbs 19 pass to illuminate the plate 5. At the front of the compartment hinged frames 21 are carried which are normally locked by conventional locks 22. The hinged frame for the upper compartment contains indicia such as the name of the driver of the automobile while the frame for the lower compartment contains indicia such as the town and State from which the license plate is issued.

In order to hold the license plate 23 against the plate 5 between the upper and lower compartment a rectangular frame 24 having a recess 26 for the reception of the edges of the tag is provided. Preferably the license plate is enclosed in a transparent envelope 27 to protect the same against dust and other foreign matter. To prevent vibration and noise incident thereto suitable rubber or felt packing 27$^a$ is received in the frame between the plate 5 and license plate.

For the purpose of detachably holding the frame against the plate 5 one end of the frame is provided with laterally extending L-shaped lug 28 which passes through slots 29 in one end of the plate and interlock as disclosed in Fig. 4. At its opposite end the frame is formed with an extension 29ª which abuts the plate 5 and carries a right angular extending slotted lug or hasp 30 which extends through a slot 31 in the plate 5. A conventional padlock 32 extends to the member 30 to lock the frame to the plate 5. It will be thus observed that unauthorized persons cannot readily remove the frame to remove the tag. This arrangement will tend to thwart stealing of motor vehicles equipped with the invention in that it will involve considerable time for one to break the lock or otherwise remove the frame. Should the frame be removed by prying the frame away from the plate 5 there would be no support for the license plate and hence a license plate could not be exchanged for the original. This arrangement will be of considerable aid to civil authorities inasmuch as the identification on the device will be a check on the identification card issued by the State.

In the modification disclosed in Fig. 7 the plate 5 is formed with an extension 33 having a semicircular recess 34 to conform to the contour of the usual tail light. In this instance lamp casings 35 are carried by the plate 5 at the opposite end of the upper compartment 18.

Figure 8:
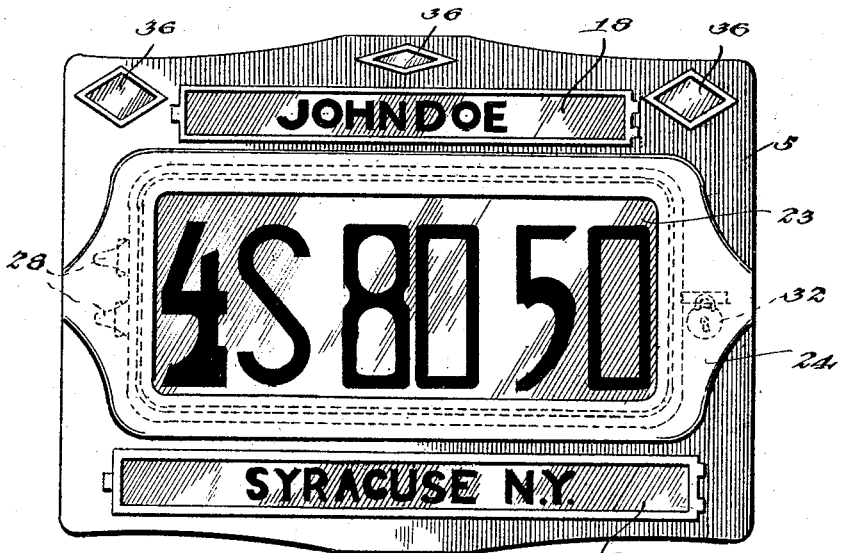
Fig. 8 is a similar view of another modification.

In the construction disclosed in Fig. 8 the plate 5 is of substantially rectangular configuration and is provided with a plurality of lamp compartments 36 at its upper edge.

It will be observed that the principal feature of all the embodiments of the invention is the plate 5 and frame 24 cooperating to clamp the license plate in operation position and to lock the same against removal by unauthorized persons.

Although we have described the invention as being applicable to motor vehicles it is of course obvious that it might apply to automobiles, both pleasure and commercial, buses, also aeroplanes or motor cycles. One of the purposes of the invention is to standardize the shape and type of the license plate so as to make the same universal.

What is claimed is:

1. In a license tag holder a plate having a central sleeve, a bracket having one end received in the sleeve, a spider attached to the bracket and having radial arms rigidly attached to the plate, and means for supporting a license plate on the plate.

2. In a license plate holder, a plate to be fixed to part of the motor vehicle, and having a plurality of slots at one edge, a rectangular frame to be positioned against the plate, a plurality of L-shaped lugs projecting from one end of the frame and having interlocking engagement with the plate through the slots, a slotted member projecting from the opposite end of the frame and insertible through an opening in the plate, and adapted to receive a lock.

3. In a license plate holder a plate having a central opening, a bracket having one end received in the opening and anchored to the plate, a brace member received on the bracket having a plurality of radial arms which are secured to the rear face of the plate.

4. In a license plate holder, a plate to be mounted on a vehicle and having a plurality of slots at one edge, a frame to be positioned against the plate, a plurality of substantially L-shaped lugs projecting from one end of the frame and having interlocking engagement with the plate through the slots, a slotted member projecting from the opposite end of the frame and insertible through an opening in the plate and adapted to receive a fastening.

JACOB ORESTER.
WILLIAM JOHN GEE.